(12) United States Patent
Svenningsson et al.

(10) Patent No.: US 6,945,740 B2
(45) Date of Patent: Sep. 20, 2005

(54) ROTATABLE CUTTING TOOL WITH CUTTING INSERTS FOR CHIP REMOVING MACHINING

(75) Inventors: Inge Svenningsson, Sandviken (SE); Ralf Lehto, Gävle (SE); Lars-Gunnar Wallström, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 11 days.

(21) Appl. No.: 10/798,297

(22) Filed: Mar. 12, 2004

(65) Prior Publication Data
US 2005/0111925 A1 May 26, 2005

(30) Foreign Application Priority Data
Mar. 12, 2003 (SE) ................................. 0300662

(51) Int. Cl.[7] ................................. B23B 51/04
(52) U.S. Cl. ............................ 407/61; 407/42; 407/113
(58) Field of Search ........................... 408/223; 407/42, 407/61, 113, 34, 40, 47, 48, 53

(56) References Cited

U.S. PATENT DOCUMENTS 4,090,801 A * 5/1978 Faber ......................... 407/113
4,475,851 A * 10/1984 Hale .......................... 407/113
4,558,975 A * 12/1985 Hale .......................... 408/186
4,681,488 A * 7/1987 Markusson .................. 407/114
4,940,369 A * 7/1990 Aebi et al. .................... 407/42
5,984,592 A * 11/1999 Harper et al. ................. 407/40
6,413,023 B1   7/2002 Nagashima
6,764,254 B2 * 7/2004 Emoto et al. ................. 407/34

* cited by examiner

Primary Examiner—Willmon Fridie, Jr.
(74) Attorney, Agent, or Firm—Burns, Doane, Swecker & Mathis, L.L.P.

(57) ABSTRACT

A rotatable cutting tool for chip-removing machining includes a basic body which defines a center axis of rotation. Cutting inserts are detachably mounted in respective cutting seats that are formed in the basic body. Each insert has a square shape and includes first and second pairs of mutually parallel major cutting edges, four corners, and four wiper edges. Each wiper edge is situated between a major cutting edge and a respective corner. The wiper edges are shorter than the major cutting edges and are inclined relative thereto, wherein an imaginary extension line of the wiper edge forms a first acute angle with the respective major cutting edge as the insert is viewed in a direction perpendicular to the top surface. The cutting seats are arranged to orient the inserts wherein an axially forwardmost wiper edge of each insert lies in a plane oriented perpendicular to the axis, and wherein a radially outermost wiper edge of each insert is oriented parallel to the axis.

16 Claims, 6 Drawing Sheets

ROTATABLE CUTTING TOOL WITH CUTTING INSERTS FOR CHIP REMOVING MACHINING

This application claims priority under 35 U.S.C. §§119 and/or 365 to patent application Ser. No. 0300662-4 filed in Sweden on Mar. 12, 2003, the entire content of which is hereby incorporated by reference.

TECHNICAL FIELD OF THE INVENTION

In a first aspect, this invention relates to a rotatable cutting tool intended for chip removing machining, which comprises a basic body rotatable around a geometrical center axis, and a number of peripherally spaced-apart, detachable cutting inserts, which can be fixed in respective cutting seats adjacent to chip channels formed in the transition between a front end surface and an envelope surface on the basic body. Each cutting insert is indexable in four different positions by having a square basic shape and having major cutting edges arranged mutually parallel in pairs.

In a second aspect, the invention also relates to a cutting insert for the tool.

BACKGROUND OF THE INVENTION

Within the modern technique for cutting or chip removing machining, a variety of different milling tools are found by means of which mainly metallic workpieces can be machined in miscellaneous ways. When milling tools are used, it is natural to designate the machining operations in question under the comprehensive term "milling". In certain cases, the machining operations have, however, also the character of drilling, viz, when the milling tools are utilized for producing holes in workpieces.

A usually occurring method for genuine milling consists of face milling. In this connection, the milling tool is moved laterally or radially in relation to the rotational axis thereof, the chip removing machining being carried out by means of the peripherical cutting edges of the cutting inserts at the same time as cutting edges along the front end surface of the tool generate the desired, planar surface on the workpiece. The cutting depth in the axial direction is determined by how deep the peripheral edges cut into the material. The chip thickness varies depending on how the cutting inserts enter workpieces. In this respect, the size of the setting angle (κ) of the cutting inserts, which is measured between the machined planar surface and the surface that is generated by the major cutting edges, is crucial in face milling. In modern face milling, the setting angles vary between 90° and 45°. At one and the same cutting depth, the larger angle 90° generates a relatively thick and narrow chip, while the smaller angle 45° generates a thinner and wider chip.

Another milling method consists of plunge-cut milling. In this case, the milling cutter is moved in the axial direction along the surface of the workpiece from which material should be removed, semi-cylindrical or concavely curved grooves being left in the surface. In doing so, the chip removing by the cutting edges is guaranteed along the front end of the tool rather than by peripheral cutting edges.

An additional milling method consists of full-hole helix milling. This method enables the formation of large holes, more precisely by the fact that the tool is entered axially towards the workpiece and is set in motion in a circular, spiral or helix path around the center of the hole to be made, while providing a hole having a greater diameter than the tool itself. Thus, in this case, the tool moves axially as well as radially.

Yet another milling method consists of so-called ramping. The object of such milling is to provide a machined surface which extends other than at a right angle to the rotational axis of the tool. Therefore, in this case, the milling tool is moved simultaneously in the axial as well as the radial direction. Conventionally, it is understood by ramping that the tool is moved in a straight path in the radial direction in relation to the rotational axis while providing a shallow, straight groove in the workpiece, viz, a groove that is delimited by a curved bottom and two straight side surfaces or so-called shoulders. Thus, ramping and full-hole helix milling are closely related with each other in that the single difference between the methods is that the milling in one case generates arched, usually circular arc-shaped shoulders (full-hole helix milling) and in the other case (ramping) straight shoulders are generated. In other words, full-hole helix milling can be said to be a special case of ramping, because the milling tool in both cases is moved axially as well as laterally.

Previously known milling tools for the milling methods described above have most disparate designs depending on the specific field of application. Generally, a dividing line (construction-wise) can be perceived between the milling tools that in the main only undergo to axial feeding motions (such as milling cutters for plunge-cut milling) in contrast to milling tools that primarily undergo radial feeding motions (such as face mills).

In the first-mentioned case (plunge-cut milling), the milling tools can without problem be formed with considerable length in relation to the diameter. Milling cutters for plunge-cut milling may, for instance, have a length/diameter ratio up to 6, i.e., the length of the tool may amount to six times the diameter (6×D). Milling tools that are exposed to large lateral forces can, however, not be made too long. For instance, a face mill having the setting angle 45° of the chip removing cutting edges cannot operate with a greater length/diameter ratio than 2 or 3. At a 90° setting angle, said ration is even smaller. The reason for this difference is that the rigidity of the tool always should be in the direction of chip thickness. Thus, upon milling in multioperation machines, the milling rate is limited by the dynamic stability in the system tool/spindle.

When the cutting depth exceeds a certain value, fed-back vibrations arise, i.e., a so-called regenerative effect. When the tool vibrates, the edges cut a wavy surface in the workpiece and when the same edges later—still vibrating—cut over said wave-shaped surface, a chip is generated having a varying chip thickness. The varying chip thickness results in cutting force variations, which in turn make the system tool/spindle vibrate. The vibration level may become so high that machining in practice becomes impossible to carry out. The regenerative vibrations are reinforced in the direction of chip thickness. For this reason, comparatively long tools (up to 6×D) having small setting angles of the cutting inserts can operate with considerable milling rate, while tools having greater setting angles (45–90°) only can operate with lengths up to 3×D. The above-mentioned regenerative effect is one of the reasons that milling tools that are exposed to large lateral forces cannot be made with a considerable length.

For the users, i.e., different actors in the engineering industry, it is naturally a disadvantage to need different types of tools for each of many different milling methods. This need is disadvantageous not only as a consequence of the fact that different milling cutters in a variety of different dimensions have to be procured and kept in stock, but also as a consequence of the fact that the different milling cutters require different embodiments of cutting inserts which are quickly consumed. The stock-keeping and the administration that is associated therewith, become accordingly extensive.

From U.S. Pat. No. 6,413,023-B1, a milling tool is previously known having cutting inserts, the major cutting edges of which have a setting angle (κ) within the range of 3–35°. However, in that case, the major cutting edges are very short (i.e., less than half the width of the cutting insert) and combined with arched edge portions at the opposite ends thereof. This means that the cutting inserts cannot generate any planar and cylindrical, respectively, surfaces upon face milling and axial milling, respectively, such as plunge-cut milling. Therefore, the milling tool in question cannot be used in a universal way.

Furthermore, from U.S. Pat. No. 4,681,488, a cutting insert is known which is intended for conventional milling tools, and which has a square basic shape and four wiper edges located at an acute angle to a corresponding number of longer major cutting edges. In that case, however, said angle is about 15° or larger. For this reason, there is a risk of emergence of fed-back vibrations in connection with, for instance, face milling or ramping, and therefore the cutting insert is not suitable for a universally usable milling tool.

Objects and Features of the Invention

The present invention aims at obviating the above-mentioned disadvantages of prior art and at providing an improved milling tool. Thus, a primary object of the invention is to provide a cutting tool suited for milling, which is universally usable for many different milling and/or drilling methods and then primarily those described above, i.e., face milling, plunge-cut milling, ramping, and/or full-hole helix milling. Thus, one and the same tool should be usable in order to generate planar as well as cylindrical surfaces having a large smoothness.

SUMMARY OF THE INVENTION

According to the invention, the above-mentioned objects are attained by a rotatable cutting tool for chip-removing machining. The tool comprises a basic body which defines a center axis of rotation and includes a front end surface, an envelope surface, chip channels disposed in the envelope surface, and cutting seats formed at a transition between the front end surface and the envelope surface and disposed adjacent respective chip channels. The tool also includes cutting inserts detachably mounted in respective cutting seats. Each insert has a square basic shape and includes first and second pairs of mutually parallel cutting edges, four corners, and four wiper edges. Each wiper edge is situated between a major cutting edge and a respective corner. The wiper edge is shorter than an associated major cutting edge and is inclined relative thereto wherein an imaginary extension of the wiper edge forms a first acute angle with the major cutting edge as the insert is viewed in a direction perpendicular to the top surface. The cutting seats are arranged to orient the inserts wherein the axially forwardmost major cutting edge of each insert forms a second acute angle with the axis of rotation. The first angle is equal to the second angle, wherein an axially forwardmost wiper edge of each insert lies in a plane oriented perpendicular to the axis, and wherein a radially outermost wiper edge of each insert is oriented parallel to the axis.

In a second aspect the invention aims at providing a cutting insert, which in combination with the basic body of the tool enables universal use in connection with the different milling methods. An additional object in this respect is to provide a cutting insert, which is structurally simple and enables an optimal utilization by being indexable in four different positions. In other words, four different cutting edges should be capable of being utilized before the cutting insert is discarded. These objects are attained by a cutting insert which has a square shape and comprises opposite top and bottom sides, and four side surfaces. Transitions between the side surfaces and at least one of the top and bottom surfaces form four major cutting edges spaced apart from one another by four corners of the insert. The major cutting edges comprise two pairs of mutually parallel major cutting edges. A wiper edge is formed between each major cutting edge and a respective corner. The wiper edges are shorter than the major cutting edges and are inclined relative thereto wherein an imaginary extension line of each wiper edge forms a first acute angle with a respective major cutting edge as the insert is viewed in a direction perpendicular to the top surface. The first acute angle is at least 5° and not greater than 15°. All of the four wiper edges lie in a first imaginary square which is angularly offset by a second acute angle from a second imaginary square in which the four major cutting edges lie. The first and second acute angles are equal to one another.

The invention is based on a combination of two essential features, viz, on one hand, use of a square-shaped cutting insert having four major cutting edges, each one of which adjacent to a corner transforms into a wiper edge in a limited angle to the major cutting edge, and on the other hand the use of a basic body, the cutting seats of which are so shaped and located that the setting angle for an active major cutting edge is within the range of 5–15°, suitably 8–12°, i.e., far below the conventional angles 45° and 90°. The major cutting edges formed on the different cutting inserts and inclined at a very limited angle in relation to the front end plane of the basic body can then be utilized for conventional face milling. It is true that such face milling assumes a limited cutting depth, but, owing to the chips becoming thin, in return the tool feed rate can be radically increased. The same milling tool can also be used for plunge-cut milling or other milling where the tool is moved entirely or partly axially. The chip removing then is carried out along the major part of the length of the frontal major cutting edges, as the peripheral wiper edges that extend parallel with the rotational axis of the tool generating a cylindrical surface. Rearwards from the wiper edges seen in the axial feeding direction of the tool, appurtenant major cutting edges extend with clearance from the accordingly generated the cylinder surface.

BRIEF DESCRIPTION OF THE DRAWINGS

The objects and advantages of the invention will become apparent from the following detailed description of a preferred embodiment thereof in connection with the accompanying drawing in which like numerals designate like elements.

DESCRIPTION OF A PREFERRED EMBODIMENT OF THE INVENTION

Figure 1:
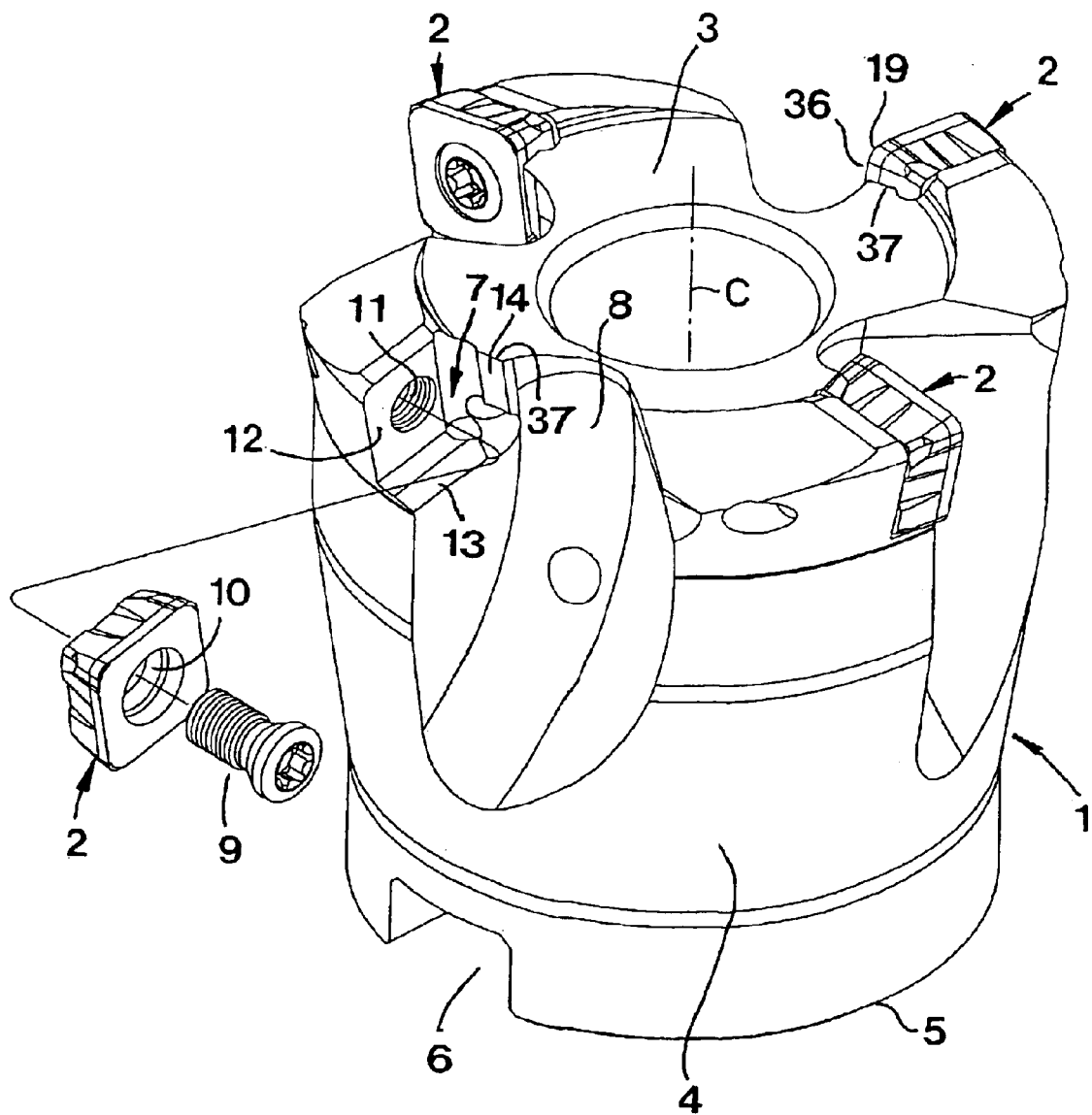
FIG. 1 is a perspective exploded view showing a basic body included in a tool according to the invention having a plurality of cutting inserts, one of which is removed from the basic body.
Figure 2:
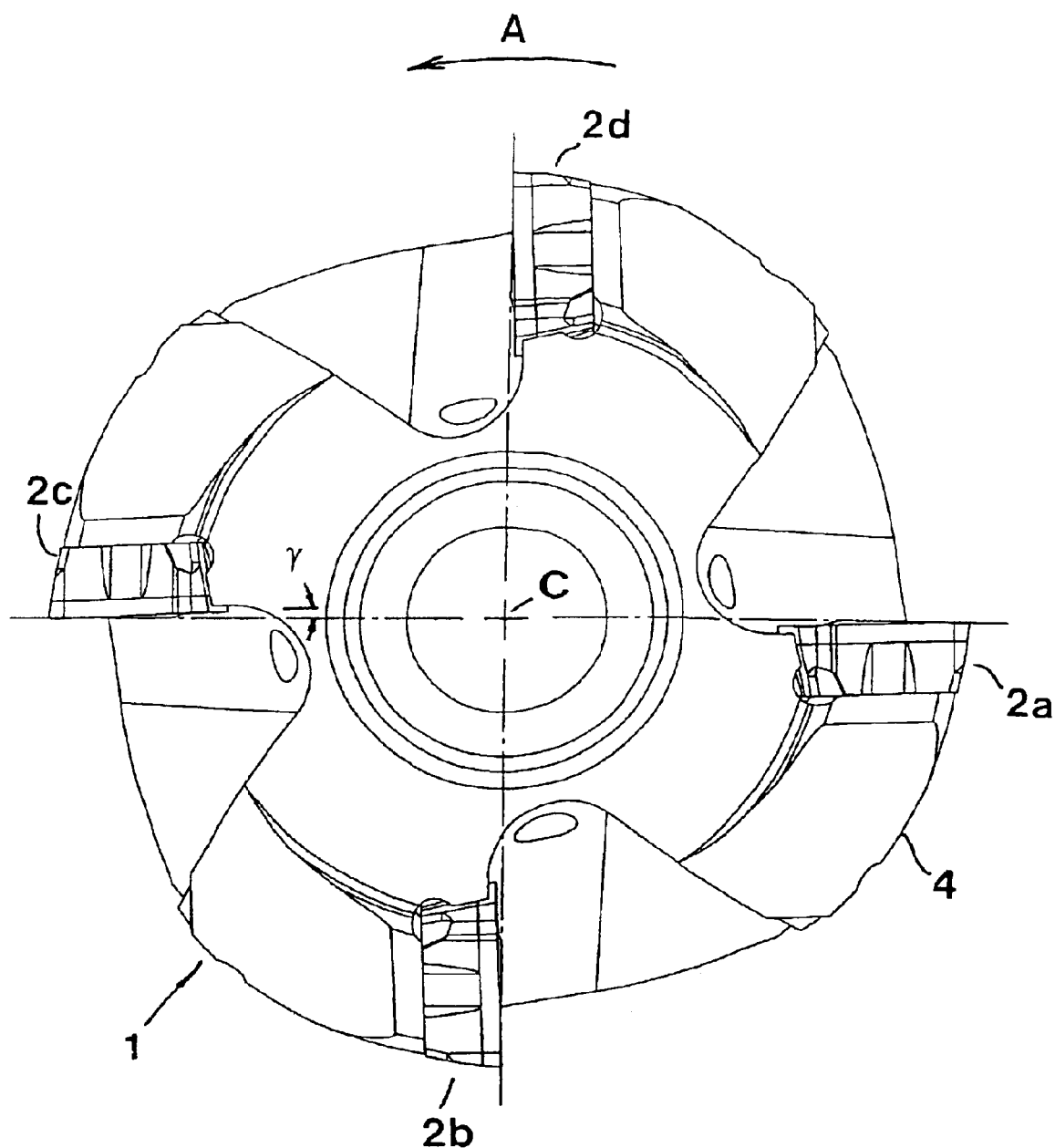
FIG. 2 is a front end, view of the tool
Figure 3:
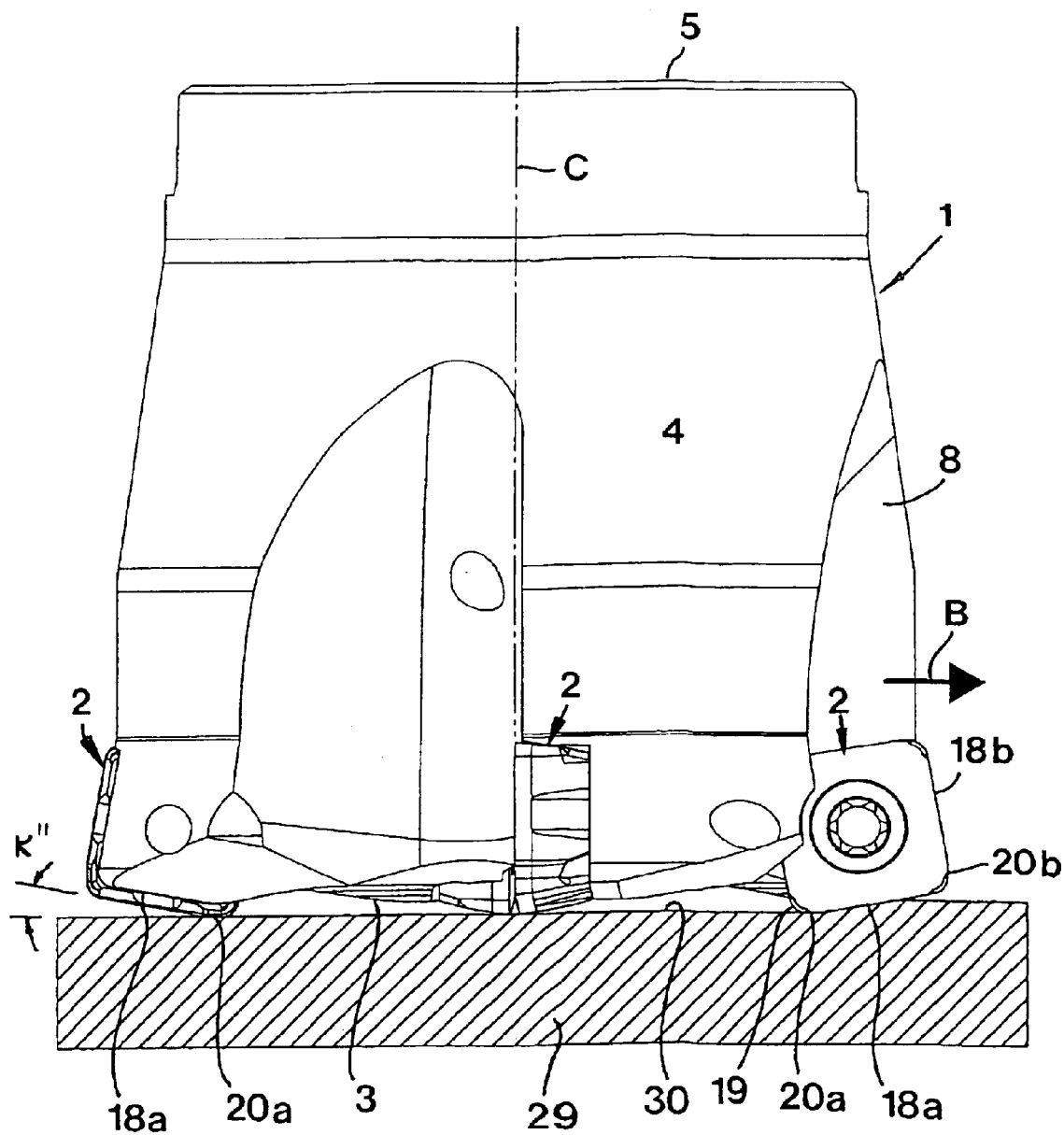
FIG. 3 is a side view of the tool during face milling of a workpiece.
Figure 4:
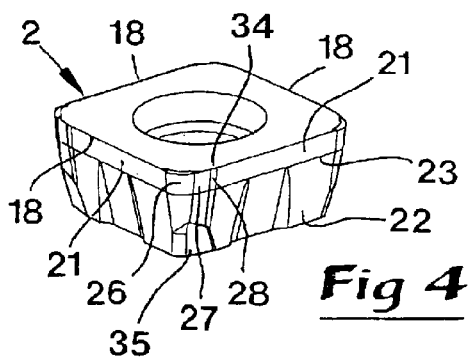
FIG. 4 is a perspective view of a cutting insert included in the tool according to the invention, as seen obliquely from above.
Figure 5:
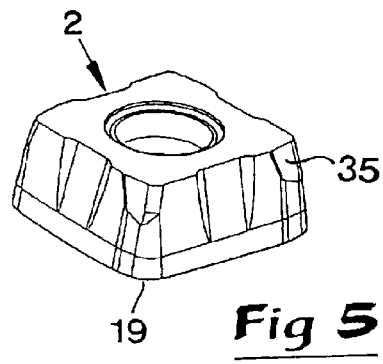
FIG. 5 is a perspective view showing the cutting insert obliquely from below.

The tool shown in FIGS. 1–3 includes a basic body 1 and a number of peripherally (circumferentially) spaced-apart, detachable cutting inserts 2. The basic body 1, which also may be called a cutter head, has a rotationally symmetrical basic shape with a front end surface 3, a rotationally symmetrical envelope surface 4 as well as a rear end surface 5 having means, e.g. a groove 6, for connection of the basic body to a driving spindle. The basic body is rotatable around a geometrical center axis C. Each individual cutting insert 2 can be fixed in a respective cutting seat 7 adjacent to a chip channel 8 in the transition between the front end surface 3 and the envelope surface 4. In the example shown, the individual cutting insert is fixed by means of a screw 9, which can be inserted through a central hole 10 in the cutting insert and tightened in a threaded hole 11, which mouths (opens) in the bottom surface 12 of the cutting seat 7. In the example, the individual cutting seat 7 is also defined by two side support surfaces 13, 14 oriented at an angle to each other, against which side surfaces the cutting insert can be pressed. In this connection, it should, however, be pointed out that a torque-resistant connection between the cutting insert and the basic body also may be provided in a way other than by means of such side support surfaces 13, 14, e.g. by means of intermeshing teeth in the interface between the cutting insert and the bottom surface 12. It is also feasible to fix the cutting inserts by means other than screws.

Reference is now made to FIGS. 4–10, which in detail illustrate an individual cutting insert 2. Said cutting insert is delimited by a top side 15, a bottom side 16, and four side surfaces 17. In the transitions between the top side 15 and said side surfaces 17, four straight major cutting edges 18 are formed, which are mutually spaced-apart via corners 19. The basic shape of the cutting insert is square, i.e., the widths W are equally large. The square shape means that opposite pairs of major cutting edges 18 are mutually parallel. In practice, the width W of the cutting insert may vary most considerably, but is usually within the range of 6–20, or 9–15 mm.

As thus far disclosed, the tool, including the cutting insert, is in all essentials previously known.

Figure 9:
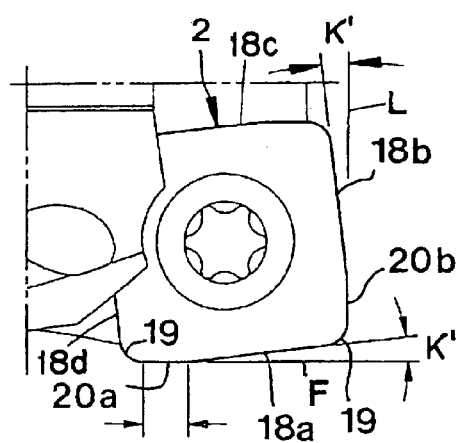
FIG. 9 is a schematic view of a cutting insert mounted in the basic body.
Figure 10:
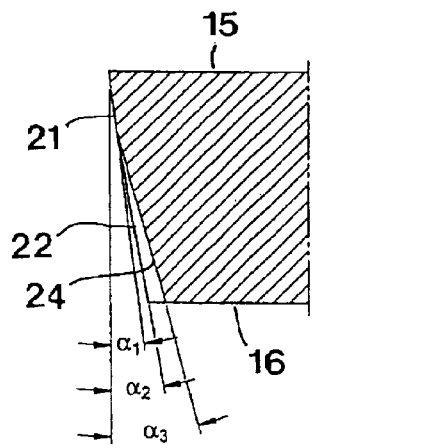
FIG. 10 is a partial section through an enlarged cutting insert illustrating different clearance angles on the cutting insert.

New and characteristic of the invention is that between the individual major cutting edge 18 and an appurtenant corner 19 on the cutting insert, a wiper edge 20 extends, which is shorter than the major cutting edge and inclined in relation to the same inasmuch as an imaginary line F defining an extension of the wiper edge forms a first acute angle κ' with the major cutting edge (see FIG. 9). In addition, the cutting seat 7 is arranged to fix the cutting insert in a position in which a first pair of parallel major cutting edges 18b, 18d extend at a second acute angle κ" with a line L that is parallel to the center axis of rotation C of the basic body. The two angles κ', κ" are of equal size, whereby an inner wiper edge 20a (see FIG. 9) of a front major cutting edge 18a (i.e., the axially forwardmost wiper edge) is oriented in a plane that is perpendicular to the center axis C (and to the paper on which FIG. 9 is depicted) in order to, upon machining, generate a planar surface. At the same time, another wiper edge 20b (i.e., the radially outermost wiper edge) is oriented along an imaginary cylinder which is concentric with the center axis C, i.e., the wiper edge 20b is parallel to the axis C.

According to the invention, the angles κ'κ" should lie in a range whose upper limit is at most 15°, suitably at most 12°, and whose lower limit is at least 5°, suitably at least 7°. Most preferably, the angles κ', κ" could amount to approx. 10°.

The major cutting edges 18 as well as the wiper edges 20 are advantageously—though not necessarily—straight in all dimensions in that they, on one hand, are located in a common plane defined by the top side of the cutting insert, and on the other hand are linear in a plane oriented at a 90° angle to the top side. However, it is also feasible to form the major cutting edges 18 slightly arched, in particular convexly arched, at the same time as the wiper edges are straight.

Figure 6:
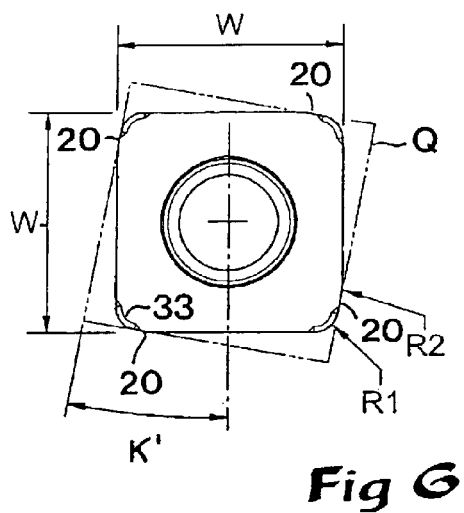
FIG. 6 is a planar view of the cutting insert seen from above.
Figure 7:
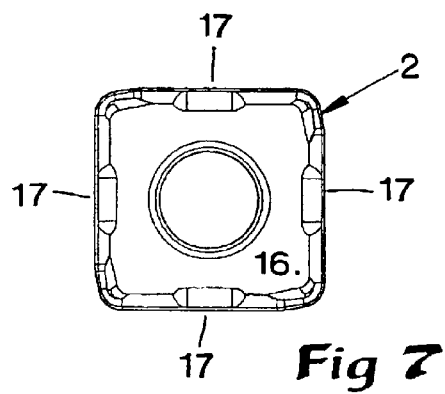
FIG. 7 is a planar view from below of the cutting insert.
Figure 8:
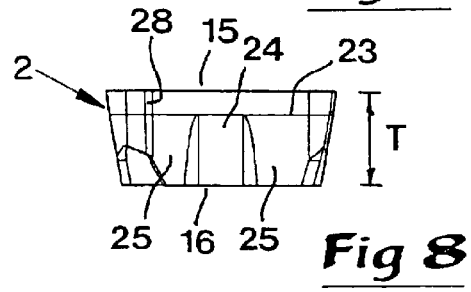
FIG. 8 is a side view of the cutting insert.

In FIG. 6 is seen that all wiper edges 20 are inscribed in an imaginary first square Q, which is twisted at said angle κ', κ" in relation to a second imaginary square that is defined by the major cutting edges. Said first square Q has the same width W as the second square.

The corners 19 are advantageously—though not necessarily—made having a convexly rounded shape. More precisely, the corners are in the shape of convexly rounded cutting edges, the radius of which is designated R1. In connection with each corner cutting edge, a particular reinforcement chamfer 33 is formed.

The individual wiper edge 20 should have a length that amounts to at least 7% and at most 25% of the length of the major cutting edge 18, the latter being measured between a corner cutting edge 19 and the transition to a wiper edge 20. Advantageously, the length of the wiper edge 20 may be within the range of 10–20% of the length of the major cutting edge. In absolute numbers, the wiper edge 20 should, however, always have a length of at least 0.5 mm, irrespective of the dimensions of the cutting insert.

As is clearly seen in FIGS. 4–10, each of the four side surfaces 17 of the cutting insert is formed with two clearance surfaces 21, 22, which extend at different respective clearance angles $\alpha_1$ and $\alpha_2$, respectively. In practice, the clearance angle $\alpha_1$ for the fairly narrow, first clearance surface 21 located adjacent to the top side of the cutting insert may amount to approximately 7°, while the clearance angle $\alpha_2$ for the second clearance surface 22 (which extends between the bottom side 16 of the cutting insert and an interruption line 23) is greater and may amount to, for instance, 10°. Centrally along the individual side surface 17, a countersink is formed, which is defined by two side surfaces and a planar surface 24, which extends at a still greater clearance angle $\alpha_3$ than the real clearance surfaces 21, 22. The angle $\alpha_3$ amounts in the example to approx. 15°.

Due to the existence of the countersink 24, which extends between the bottom side of the cutting insert and the interruption line 22, each second clearance surface 22 is divided into two smaller part surfaces 25. In this way, a more reliable abutment of the side surfaces of the cutting insert against the support surfaces 13, 14 of the cutting seat is guaranteed, and the time for grinding the insert being reduced in those cases where the precision of the tool requires grinding of the cutting inserts.

With continued reference to FIGS. 4–10, it should be pointed out that the rounded corner cutting edge 19 is formed in connection with a convexly curved corner surface portion 26, which forms a transition surface between clearance surfaces 21 and 27 that extend respectively from a major cutting edge 18 and a wiper edge 20. Between the clearance surface 27 and a nearby clearance surface 21, there is a slightly convexly curved clearance surface 28, which guarantees that each major cutting edge 18 transforms into the appurtenant wiper edge 20 via a slightly rounded, short edge portion 34 having a radius $R_2$. It should be particularly noted that the individual corner cutting edge is circular arc-shaped having a radius $R_1$, one end of which transforms directly into a major cutting edge 18 and the opposite end of which transforms directly into a wiper edge 20.

At each corner on the cutting insert, there is formed a chamfer surface 35 (see FIGS. 4 and 5) extending up from the bottom side of the cutting insert. More precisely, said chamfer surface 35 extends from the bottom side up to a point located approximately halfway between the interruption line 22 and the bottom side of the cutting insert. By the existence of said chamfer surface, clearance is guaranteed for the cutting insert mounted in the cutting seat also at small tool diameters.

Below, a specific example follows of the dimensions of a preferred cutting insert having the width W of 9.4 mm. In this connection, the cutting insert has a thickness T (measured between the top side 15 and the bottom side 16) of 4.0 mm. In other words, the thickness of the cutting insert is somewhat smaller than half of the width of the cutting insert. The inner diameter of the hole 10 is 4.1 mm. The angle κ' (and $_κ$") amounts to 10°. The length of the major cutting edge 18 amounts to 6.0 mm, while the length of the wiper edge 20 amounts to 0.8 mm. The radius $R_1$=1 mm and the radius $R_2$=2 mm.

In FIG. 2 is seen how the individual cutting insert 2 is located at a positive radial angle γ. In practice, the angle γ may amount to 2°. In FIG. 2 is also shown the direction of rotation A of the milling tool.

In FIG. 3, the tool is shown during machining of a workpiece 29. More precisely, the tool is shown during face milling of the workpiece, the tool being moved radially laterally, more precisely perpendicularly to the rotational axis C, as is indicated by the arrow B. In this connection, the chip-removing from the workpiece takes place by means of the major cutting edges 18a which are facing forwards and have the setting angle κ' at the same time that the inner wiper edge 20A of each insert generates a planar and smooth surface 30.

Figure 11:
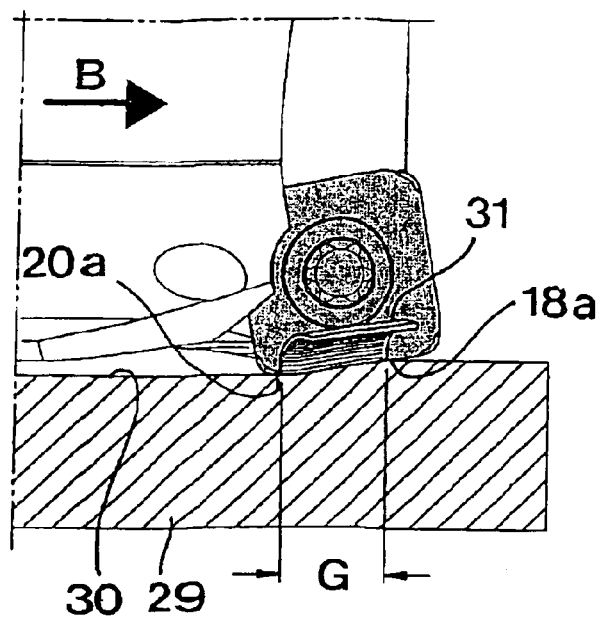
FIG. 11 is a partial view showing the function of the tool during face milling.

Also, in FIG. 11, the tool is shown during face milling in the direction of the arrow B, wherein is visualized how a chip 31 is separated by the front major cutting edge 18a at the same time as the inner wiper edge 20a generates a planar and smooth surface 30. Upon such milling, the cutting depth is set in such a way that the width G of the chip 31 does not exceed the length of the major cutting edge 18a. In practice, this means that the cutting depth becomes moderate; something which, however, is readily compensated for by a substantially increased tool feed rate.

Figure 12:
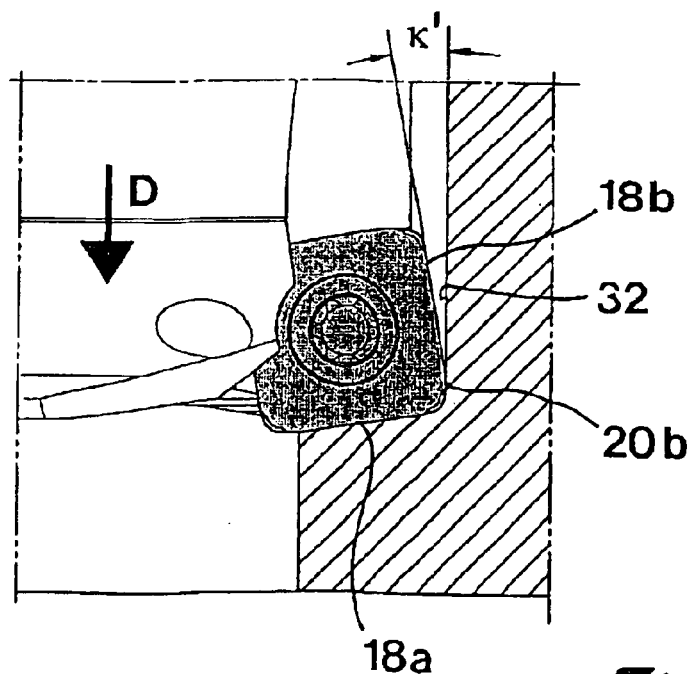
FIG. 12 is a view analogous to FIG. 11 showing the tool during plunge-cut milling.

In FIG. 12, an alternative milling method is shown in the form of plunge-cut milling. In this connection, the feeding direction of the tool is axial, as is outlined by means of the arrow D. In this case, chip removal takes place along a large part of the frontal major cutting edge 18a at the same time as the outer, peripheral wiper edge 20b generates a cylindrical surface 32 in the workpiece. In this connection, the major cutting edge 18b adjacent to the wiper edge 20b clears from the generated cylinder surface 32, more precisely at a clearance angle, which is equal to the aforementioned angle κ'.

Thus, from a comparison between FIGS. 11 and 12 is seen that the tool according to the invention can, in a universal way, be used not only for the generation of a solely planar and smooth surface 30, such as in face milling, but also, if required, for the generation of a cylindrical surface 32.

Figure 13:
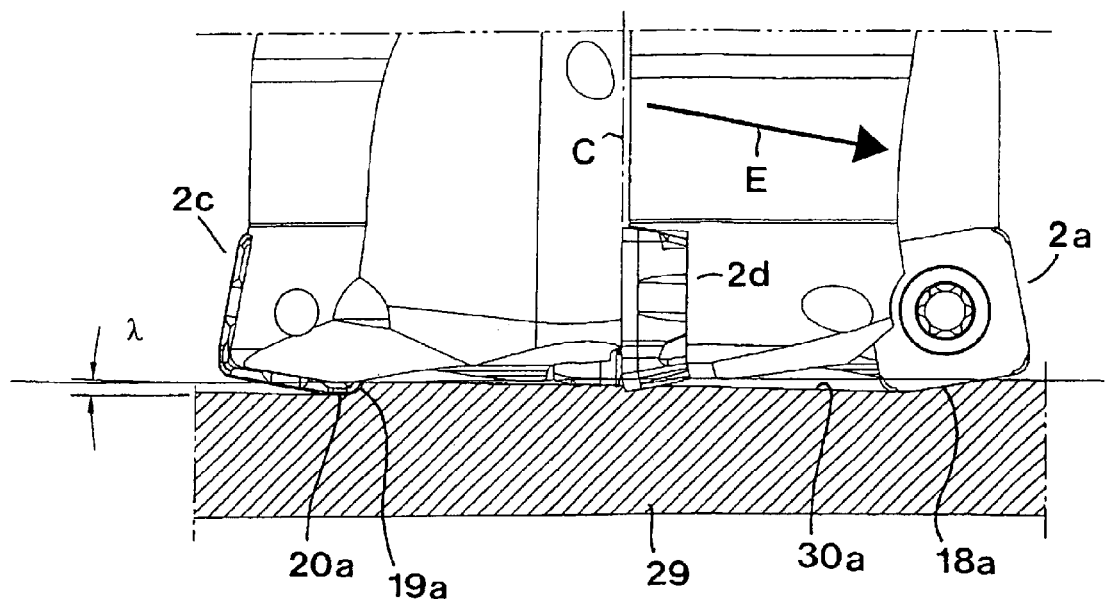
FIG. 13 is a side view of the tool showing the same during ramping-type machining of a workpiece shown in cross-section.
Figure 14:
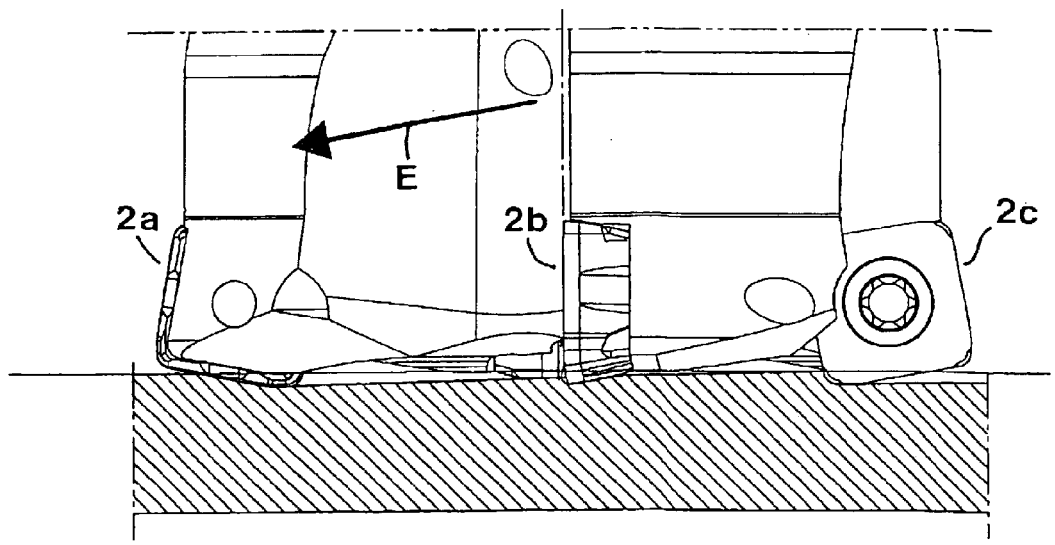
FIG. 14 is a side view analogous to FIG. 13 showing the same tool from a diametrically opposite direction.

Finally, reference is made to FIGS. 13 and 14, which illustrate the tool during so-called ramping. In this case, the tool is moved not only laterally or radially in relation to the center axis, but simultaneously also axially, thereby producing a resultant movement in a direction indicated by means of the arrow E (the arrow E being shown with an exaggerated angle of inclination for the sake of clarity). In order to distinguish the different cutting inserts in FIGS. 13–14, reference is first made to FIG. 2, which illustrates the milling tool in a front end view, i.e., from below. Thus, when the tool is turned down 90° out of the plane according to FIG. 2 to the position according to FIG. 13, the cutting insert 2a will be located to the right and the cutting insert 2c to the left, with the cutting insert 2d placed halfway between. In the view from behind, according to FIG. 14, the cutting insert 2a is seen to the left and the insert 2c to the right, with the cutting insert 2b halfway between. It should be particularly pointed out that the cross-sectional plane intersecting the workpiece 29 extends through the cutting inserts 2a and 2c, the cutting inserts 2b and 2d are located considerably closer to, or farther from the observer than the cross-sectional plane.

An important structural feature of the invention is that each inner corner cutting edge 19 associated with a front corner cutting edge 18 has a certain clearance (spacing) from the front end surface 3 of the basic body. This is most clearly seen in FIG. 1, with the reference designation 36 indicating how the corner cutting edge 19 is located at a certain axial distance from the front edge 37, which adjoins the side support surface 14 of the appurtenant cutting seat 7. By the fact that the corners of the cutting insert have said clearance in relation to the front end surface 3, it is guaranteed that not only the corner cutting edge 19, but also a certain part of the major cutting edge turned inwards, are exposed in order to be able to remove chips.

Now reference is made again to FIGS. 13 and 14, which illustrate the function of the tool upon ramping. In the same way as in face milling, the cutting insert (in the example the cutting insert 2a) that in every instant is farthest forward in the feeding direction E removes material from the workpiece along the major cutting edge 18a thereof, the cutting insert leaving a planar surface 30a. However, owing to the fact that the basic body, during the feeding thereof, is moved not only radially but also axially, said machined surface 30a will be oriented at a certain angle λ to an imaginary plane oriented perpendicular to the center axis C. The material that remains between the inclined surface 30a and said plane is, however, removed by the cutting insert instantaneously positioned on the diametrically opposed side of the basic body, i.e., the cutting insert 2c, which with the inner corner cutting edge 19a thereof together with the appurtenant wiper edge 20a removes the remaining material. In other words, upon ramping the milling cutter can cut itself free from the material.

It should be pointed out that the peripheral wiper edge 20b, which is parallel with the center axis C (see FIG. 12), can generate a cylindrical surface during plunge-cut milling. Also, during face milling, ramping as well as helix milling, that edge 20b can generate a shoulder that is generally parallel with the rotational axis or the center axis and, that, in face milling and radial ramping, is straight or planar.

Another advantage of the milling tool according to the invention—besides the universal usability—is that the cutting inserts, due to the square shape thereof, are indexable in four different positions. This means that the cutting inserts can be utilized optimally, irrespective of the milling method chosen from case to case.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A rotatable cutting tool for chip removing machining, comprising:
    a basic body defining a center axis of rotation and including:
        a front end surface,
        an envelope surface,
        chip channels disposed in the envelope surface, and
        cutting seats formed at a transition between the front end surface and the envelope surface and disposed adjacent respective chip channels; and
    cutting inserts detachable mounted in respective cutting seats, each insert having a square shape and including:
        first and second pairs of mutually parallel major cutting edges,
        four corners, and
        four wiper edges, each wiper edge situated between a major cutting edge and a respective corner, the wiper edges being shorter than the major cutting edges and inclined relative thereto wherein an imaginary extension line of the wiper edge forms a first acute angle with respective major cutting edge as the insert is viewed in a direction perpendicular to the top surface, the cutting seats arranged to orient the inserts wherein the axially forwardmost major cutting edge of each insert forms a second acute angle with the axis of rotation, the first angle being equal to the second angle, wherein an axially forwardmost wiper edge of each insert lies in a plane oriented perpendicular to the axis, and wherein a radially outermost wiper edge of each insert is oriented parallel to the axis.

2. The cutting tool according to claim 1 wherein the first and second angles are no greater than 15°.

3. The cutting tool according to claim 2 wherein the first and second angles are at least 5°.

4. The cutting tool according to claim 1 wherein the first and second angles are at least 5°.

5. The cutting tool according to claim 1 each cutting seat includes a bottom surface and two side support surfaces oriented perpendicular to each other, one of the side support surfaces forming a third angle with the center axis, the third angle being equal to each of the first and second angles.

6. The cutting tool according to claim 1 wherein each corner comprises a convexly arched corner edge connected at its opposite ends to a major cutting edge and a wiper edge, respectively.

7. The cutting tool according to claim 6 wherein each insert projects axially forwardly of the front end surface.

8. A cutting insert having a square shape and comprising opposite top and bottom sides, and four side surfaces, wherein transitions between the side surfaces and at least one of the top and bottom surfaces form four major cutting edges spaced apart from one another by four corners of the insert; the major cutting edges comprising two pairs of mutually parallel major cutting edges; a wiper edge formed between each major cutting edge and a respective corner, the wiper edges being shorter than the major cutting edges and inclined relative thereto wherein an imaginary extension line of each wiper edge forms a first acute angle with a respective major cutting edge as the insert is viewed in a direction perpendicular to the top surface, the first acute angle being at least 5° and not greater than 15°; all of the four wiper edges lying in a first imaginary square which is angularly offset by a second acute angle from a second imaginary square in which the four major cutting edges lie; the first and second acute angles being equal to one another.

9. The cutting insert according to claim 8 wherein each corner forms a convexly arched corner cutting edge.

10. The cutting insert according to claim 9 wherein each wiper edge is linear.

11. The cutting insert according to claim 8 wherein each wiper edge is linear.

12. The cutting insert according to claim 9 wherein all of the major cutting edges, the wiper edges and the corner cutting edges of the at least one of the top and bottom surfaces lie in a common plane.

13. The cutting insert according to claim 8 wherein each wiper edge has a length in the range of 7 to 25% of a length of each major cutting edge.

14. The cutting insert according to claim 8 wherein the at least one of the top and bottom surfaces constitutes the top surface; each side surface comprising a first clearance surface disposed adjacent the top surface, and a second clearance surface disposed adjacent the bottom surface, the first and second clearance surfaces defining first and second non-equal clearance angles, respectively.

15. The cutting insert according to claim 8 wherein a countersink is formed in each side surface at a location spaced from the two corners associated with the respective side surface.

16. The cutting insert according to claim 8 wherein the at least one of the top and bottom surfaces constitutes the top surface, each corner including beveling extending from the bottom surface along a transition of the corner with each of the two associated side surfaces.

* * * * *